United States Patent [19]

Lederman

[11] Patent Number: 4,708,497
[45] Date of Patent: Nov. 24, 1987

[54] UNITIZED BEARING WITH FREE MOLDED SEALS

[75] Inventor: Frederick E. Lederman, Sandusky, Ohio

[73] Assignee: General Motors Corporation, Detroit, Mich.

[21] Appl. No.: 926,270

[22] Filed: Nov. 3, 1986

[51] Int. Cl.[4] .............................................. F16C 33/78
[52] U.S. Cl. .................................... 384/448; 384/607; 384/614; 384/615; 384/617
[58] Field of Search ............... 384/448, 607, 614, 615, 384/617, 486, 147

[56] References Cited

U.S. PATENT DOCUMENTS

| | | | |
|---|---|---|---|
| 3,414,341 | 12/1968 | Murphy | 384/607 |
| 4,313,644 | 2/1982 | Dagiel | 384/607 |
| 4,368,932 | 1/1983 | Wolzenburg | 384/607 |
| 4,398,777 | 8/1983 | Murphy | 384/448 |

Primary Examiner—Lenard A. Footland
Attorney, Agent, or Firm—Patrick M. Griffin

[57] ABSTRACT

A thrust bearing for use in a steerable McPherson strut suspension uses free molded seals, but is sealed at all times regardless of the axial forces acting on the bearing, and is maintained as a unitized structure as well. Retention flanges on the cage interfit with conical sealing surfaces of the races to limit axial race separation and unitize the bearing. Free molded seals with conical walls matching the respective sealing surfaces are maintained in a radial tension against the sealing surfaces by virtue of being supported on the cage and on the sealing surfaces with a stretch fit. The sealing walls are prevented from disengaging the sealing surfaces by the controlled race axial separation, and the tension of the sealing engagement actually increases because of the orientation of the sealing walls and sealing surfaces.

3 Claims, 3 Drawing Figures

UNITIZED BEARING WITH FREE MOLDED SEALS

This invention relates to bearings in general and specifically to a thrust bearing in which race and cage structure cooperate in a novel fashion with elastomeric free molded seals to give a bearing that is both unitized and sealed.

BACKGROUND OF THE INVENTION

Thrust bearing assemblies generally include a pair of axially spaced races and a circular complement of rolling bearing elements received between pathways ground into the races. The bearing is so named because, while operating, it is under a compressive load that forces or thrusts the races axially toward one another. While the load may have a significant radial component, it does not generally reverse axial direction. Consequently, such a bearing needs no structure to prevent the races from axially separating once the bearing is installed and operating. However, such a bearing still must be shipped and handled prior to installation, and it is then subjected to forces that would axially separate the races, in the absence of some structure to retain them together.

One common application for thrust bearings is the suspension of a vehicle, especially steerable McPherson struts, where the provision of a rolling bearing gives superior steering and handling feel. A vehicle suspension is an application where unitization of the bearing during installation and handling on the line is desirable. Furthermore, a vehicle suspension is a harsh environment where a sealed bearing is almost essential. There are many different approaches to both sealing and unitization in steerable McPherson strut bearings disclosed in the published patents. One approach is to mount the bearing within the elastomer material of the the upper mount of the suspension strut itself so as to wrap and seal the bearing. An example may be seen in U.S. Pat. No. 4,274,655, assigned to the assignee of the present invention. Another possibility, when the bearing can be partially protected and shielded within the pad, is to use a non-rubbing labyrinth seal, as may be seen in U.S. Pat. No. 4,541,744, assigned to the assignee of the present invention. Such an approach finds utility where it is practical to mount the bearing within the elastomer pad of the upper mount, which is not always possible.

Another approach is to mold elastomer seals directly to one of the bearing races and snap engage the seal with the other race, thereby both sealing and unitizing the bearing. Two examples may be seen in U.S. Pat. Nos. 4,120,543 and 4,400,041, also assigned to the same assignee. However, there is a great cost disadvantage to directly molding elastomer to steel, as the molding process must be carefully controlled. There is also the disadvantage that the elasticity of the elastomer is then inevitably limited by the inelasticity of the steel to which it is bonded. By far the least expensive seal is a free molded seal, used in a bearing in which some structure other than the seal itself unitizes the bearing. An example may be seen in U.S. Pat. No. 4,497,523, where free molded O-rings compressed between the bearing races provide the seal, while separate snap engaged housing members enclose the races to unitize the bearing. A disadvantage of an O-ring is that it requires the compressive operating load to keep it in sealing engagement, and it disengages almost immediately upon any axial separation of the races. While that is not a problem when separate housings prevent the races from axially separating prior to installation, separate housings themselves present a cost penalty. In addition, although it is not visible in the scale of the drawings in U.S. Pat. No. 4,497,523, a conventional O-ring presents problems of its own. It cannot be allowed to just float freely between the races, some mounting groove must be added to one of the races to confine the O-ring and to prevent it from gathering as it rubs on the other race. U.S. Pat. No. 3,567,296 illustrates such an O-ring mounting groove. Besides necessitating an extra manufacturing step, the provision of an O-ring mounting groove in one race destroys the symmetry of the bearing, a symmetry which is itself very desirable from a manufacturing and installation standpoint. Such problems with conventional free molded O-rings have even led to designs in which the O-ring is, in effect, directly molded to one of the races, despite the cost penalty, see U.S. Pat. No. 4,462,608, also assigned to the assignee of the present invention.

SUMMARY OF THE INVENTION

The invention provides an improved bearing of the type described above in which structure of the cage and the bearing races cooperate with free molded seals to seal the bearing at all times, independently of the axial forces acting at that time, as well as to unitize the bearing prior to installation.

The bearing includes two identical axially spaced races, a complement of rolling bearing elements held in a cage and received between pathways ground into the races, and an inner and an outer free molded seal. Each race has an inner and an outer sealing surface ground into it coaxial to and bordering its pathway. The sealing surfaces on each race radially confront one another, and diverge axially and radially relative to the pathways, an orientation that provides several advantages in both unitizing and sealing the bearing.

The cage includes a pair of diagonally opposed annular retention flanges, one of which radially overlies an inner sealing surface on one race and the other of which radially overlies an outer sealing surface on the other race, with a predetermined axial clearance. Thus, frictional rubbing between the cage and the races is avoided while the bearing operates, but the respective sealing surfaces and cage flanges engage to prevent the races from axially separating by any more than the predetermined clearance before installation. The cage also includes a substantially cylindrical wall located on the outer side of the ball complement that has a diameter less than the outer sealing surfaces. Beyond its function in holding the races together, the cage cooperates in maintaining the bearing sealed.

The radially outer side of the bearing is sealed by an outer seal free molded of an elastomeric material in a generally annular shape, with a free inner diameter less than the cylindrical wall of the cage. The outer seal further includes a pair of conical sealing walls shaped similarly to the outer sealing surfaces, and a pair of secondary sealing lips located radially outboard of the sealing walls. The outer seal may be stretched over the cage cylindrical wall, thereby supporting the outer seal with its sealing walls in radially outwardly tensioned sealing engagement with the outer sealing surfaces. Thus, the outer side of the bearing is sealed without the necessity of a continual compressive load on the races. Conversely, if the races are subjected to a separating force, the cage flanges prevent them from axially separating by more than the predetermined clearance, thereby preventing the sealing walls of the outer seal from disengaging from the outer sealing surfaces. Furthermore, when the races do tend to separate, the tension of the sealing walls against the outer sealing surfaces can actually increase, by virtue of their matching conical shape and their orientation relative to the bearing axis. To provide additional sealing on the radially outer side of the bearing, the secondary sealing lips of the outer seal are axially compressed between the races, and are also prevented from decompressing by the cage flanges, when the races tend to separate.

Sealing for the radially inner side of the bearing is similarly provided by a free molded inner seal of the same material, also with a generally annular shape. The inner seal also has conical sealing walls that generally match the shape of the inner sealing surfaces, but with a smaller free inner diameter, and a pair of secondary sealing lips located radially inboard of the sealing walls. The inner seal may thus be supported by stretching its sealing walls over the inner sealing surfaces to remain in radially inwardly tensioned sealing engagement therewith independently of the axial forces acting on the bearing. As with the outer seal, when the races tend to axially separate, the cage retention flanges prevent the sealing walls of the inner race and the inner sealing surfaces from disengaging, while allowing the tension to actually increase. To provide additional sealing on the radially inner side of the bearing, the secondary sealing lips of the inner seal are also axially compressed between the races, and are similarly prevented from decompressing. The net effect of this cooperation between the cage, races and free molded seals is that the inner and outer sides of the bearing are doubly sealed at all times, and the bearing is maintained as a unitary structure prior to installation.

It is, therefore, a broad object of the invention to provide an improved thrust bearing having axially opposed races, with a complement of caged rolling elements received between pathways of the races and free molded inner and outer seals, in which the races, cage and seals cooperate to maintain the bearing sealed at all times independently of the axial forces acting on the bearing, as well as to maintain the bearing as a unitary structure prior to its installation.

It is another object of the invention to provide such an improved bearing in which outer and inner seals are maintained by the cage and by the races in radial sealing tension with sealing surfaces of the races independently of the axial forces acting on the bearing.

It is yet another object of the invention to such a bearing in which the tension of the sealing engagement between the seals and the sealing surfaces can actually increase when the bearing races tend to separate.

It is yet another object of the invention to provide such a bearing in which each race has an inner and an outer conical sealing surface bordering each pathway and diverging axially and radially relative to the pathways, and in which the cage has retention flanges radially overlying at least one inner sealing surface on one race and one outer sealing surface on the other race with a predetermined axial clearance, thereby reducing friction while the bearing operates, but preventing the races from axially separating by more than the predetermined axial clearance, and in which the cage also has a substantially cylindrical wall with a diameter less than the outer sealing surfaces, and in which the outer seal is elastic and has a free inner diameter less than the cage cylindrical wall and also includes a pair of conical sealing walls shaped similarly to the outer sealing surfaces, so that the outer seal may be supported by stretching it over the cage cylindrical wall, thereby maintaining the sealing walls in radially outwardly tensioned sealing engagement with the outer sealing surfaces independently of the axial forces acting on the bearing, with the cage retention flanges, by preventing the races from axially separating by more than the predetermined clearance, thereby preventing the sealing walls of the outer seal and the outer sealing surfaces from disengaging while also allowing the tension of their sealing engagement to increase, by virtue of their matching conical shape and their orientation relative to the bearing axis, and, in which the inner seal is also elastic and has a pair of conical sealing walls shaped similarly to the inner sealing surfaces, but with a smaller free inner diameter, so that the inner seal may be supported by stretching its sealing walls over the inner sealing surfaces to remain in radially inwardly tensioned sealing engagement therewith, also independently of the axial forces acting on the bearing, with the cage retention flanges similarly preventing the sealing walls of the inner seal and the inner sealing surfaces from disengaging while allowing their tensioned engagement to increase, the net effect of which is that both the inner and outer sides of the bearing are sealed while the bearing is maintained as a unitary structure prior to installation.

DESCRIPTION OF THE PREFERRED EMBODIMENT

These and other objects and features of the invention will appear from the following written description and from the drawings in which.

Figure 1:
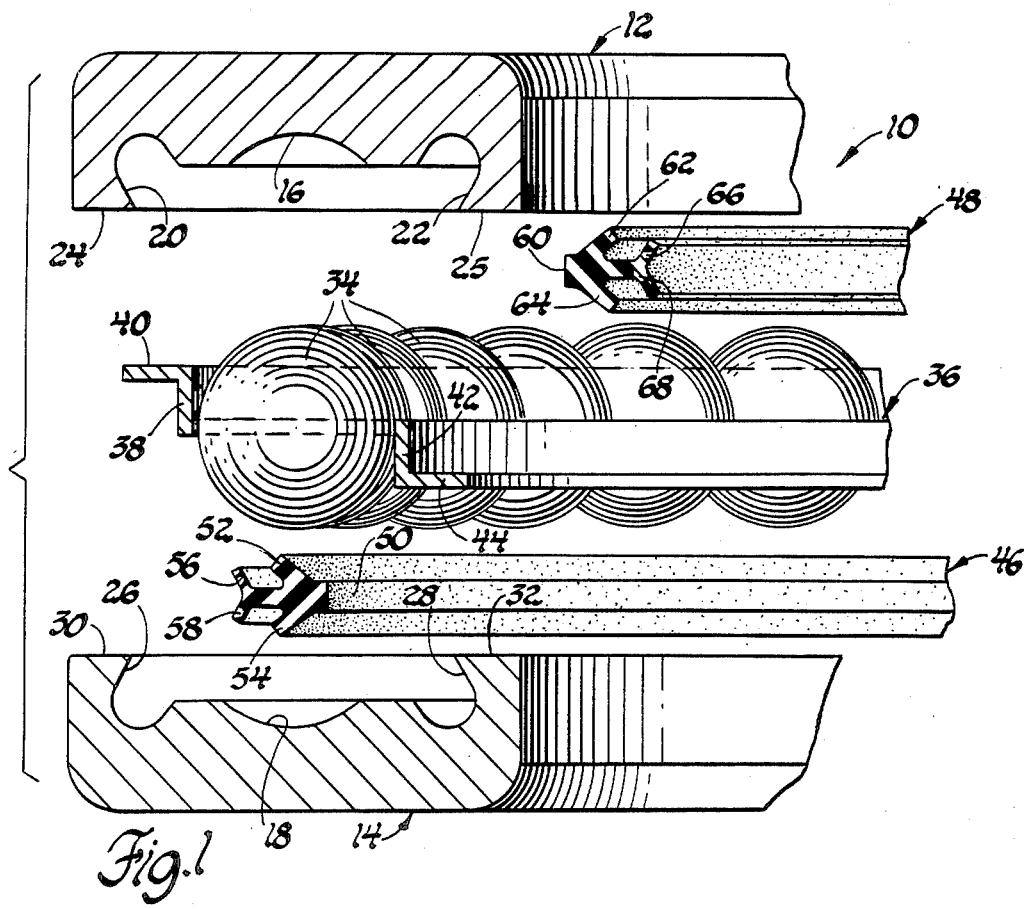
FIG. 1 is a sectional view of the components of the bearing prior to assembling them together.

Referring first to FIG. 1, the preferred embodiment of the bearing of the invention is designated generally at 10. Bearing 10 is an angular contact thrust ball bearing, and is intended particularly to be installed in a steerable McPherson strut suspension, not illustrated. As such, bearing 10, after installation, supports a compressive, load, and does not need any means to maintain it as a unitary structure. However, prior to installation, bearing 10 is subjected to axial forces that would cause it to disassemble, in the absence of some unitizing structure, and it is desirable that it be sealed at all times, particularly after installation in the suspension environment. The invention provides the necessary unitization and sealing, as will appear.

Still referring to FIG. 1, bearing 10 includes two axially spaced races, an upper race 12 and lower race 14, formed of suitable bearing steel. Although uniquely numbered for ease of description, races 12 and 14 are identical in all respects, and each includes a pathway, 16 and 18, ground or otherwise formed into the metal coaxial to the bearing 10. Upper race 12 has an inner and an outer sealing surface 22 and 24 respectively formed into it coaxial to and bordering the pathway 16. Although generally cylindrical, the sealing surfaces 20 and 22 have a radial component, as well as an axial extent, and are thus more particularly conical in shape. Specifically, the sealing surfaces 20 and 22 radially confront one another, and diverge axially and radially relative to the bordered pathway 16, extending away from, rather than toward the pathway 16. This particular orientation cooperates both in unitizing and in sealing the bearing 10. Race 12 is formed from stock that is originally a flat disc, so that a pair of flat annular lands 24 and 25 are left to either radial side of the sealing surfaces 20 and 22 respectively, generally normal to the bearing axis. The lands 24 and 25 also serve a function in the sealing of the bearing 10. Lower race 14 includes a pathway 18 bordered by sealing surfaces 26 and 28, and has lands 30 and 32 identical to the corresponding structure of upper race 12 just described.

Figure 3:
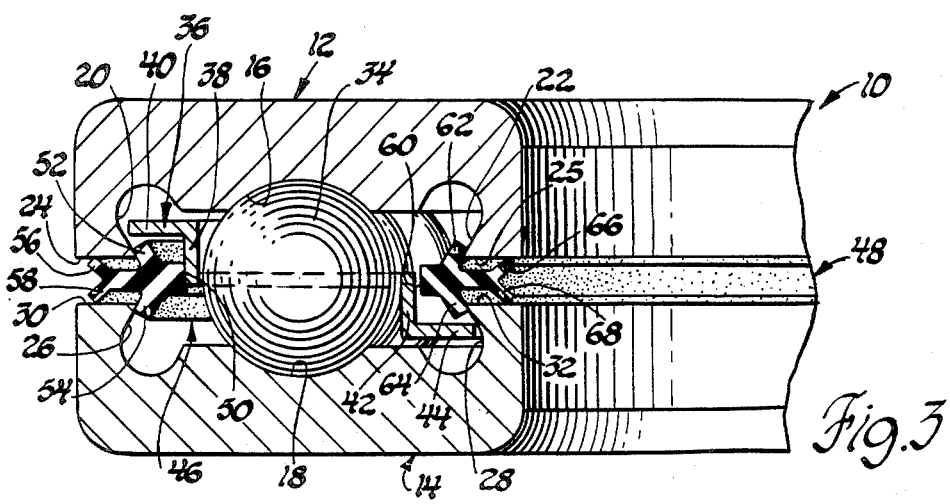
FIG. 3 is a view similar to FIG. 2, but showing the bearing completely assembled.

Referring next to FIGS. 1 and 3, bearing 10 includes a circular complement of bearing balls 34 that are received between the pathways 16 and 18 and which are circumferentially spaced by a cage, designated generally at 36, be manufactured of metal or suitable plastic. Balls 34 would be surrounded by a lubricant fill, typically grease, not illustrated. Cage 36 is generally L shaped in cross section on each side, with a radially outer cylindrical wall 38 from which an outermost annular flange 40 extends, and a radially inner cylindrical wall 42 from which an innermost annular flange 44 extends, diagonally opposed to flange 40. The cylindrical walls 38 and 42 have an outer and an inner diameter respectively that are smaller than the diameter of the outer sealing surfaces 20, 26 and inner sealing surfaces 22, 28. As best seen in FIG. 3, flange 40 radially overlies the inner sealing surface 20 of the upper race 12, while cage flange 44 radially overlies the outer sealing surface 28 of the lower race 14, with a predetermined axial clearance. It will be understood, of course, that since the races 12 and 14 are identical, the bearing 10 has no up or down, and the orientation of the flanges 40 and 44 could be switched with no effect. While the cage 36 can float axially up and down during operation of the bearing 10, the predetermined axial clearance of the flanges 40 and 44 allows the cage 36 to seek an equilibrium position of minimal rubbing between the races 12 and 14, especially if there is a heavy grease fill, which will substantially avoid frictional rubbing. However, when the races 12 and 14 are subject to axial separating forces, as during shipping and handling of the bearing 10, the diagonally opposed sealing surfaces 20, 28 and respective cage flanges 40, 44 engage to prevent the races 12 and 14 from axially separating by any more than that predetermined clearance. Thus, the flanges 40 and 44 serve as retention members, but the predetermined axial clearance referred to above, as well as the cage cylindrical wall 38, also serve an important function in sealing the bearing 10, as will appear.

Referring next to FIG. 1, bearing 10 is sealed on either side by an outer and an inner seal, designated generally at 46 and 48 respectively. Each seal 46 and 48 is free molded of an elastomeric material in a generally annular shape, and each is stretchable from its free state of FIG. 1. It will be understood that seals 46 and 48, being free molded, would not stay in a circular configuration in their free state, but are so illustrated for purposes of convenience. Each seal 46 and 48 is otherwise supported so as to take the proper configuration, as will be described. Outer seal 46 has an innermost cylindrical surface 50, which, in its free state, has an inner diameter that is approximately 5% less than the outer diameter of the cage outer cylindrical wall 38. The outer seal 46 further includes a pair of conical sealing walls, which are identical, but are separately numbered at 52 and 54 for specificity of description. Sealing walls 52 and 54 have a shape that is substantially similar to the shape of the outer sealing surfaces 20 and 26 respectively. However, the angle at which the sealing walls 52 and 54 diverge from the outer seal 46 is slightly more acute than the angle of the outer sealing surfaces 20 and 26, and they are shorter than the full axial extent of the outer sealing surfaces 20 and 26. Outer seal 46 also includes a pair of identical secondary sealing lips 56 and 58 diverging therefrom in a general Y pattern, radially outboard of the sealing walls 52 and 54. Secondary sealing lips 56 and 58 have an edge to edge width, in the free state of FIG. 1, that is greater than the axial separation between the opposed lands 24 and 30 in the assembled bearing 10.

Figure 2:
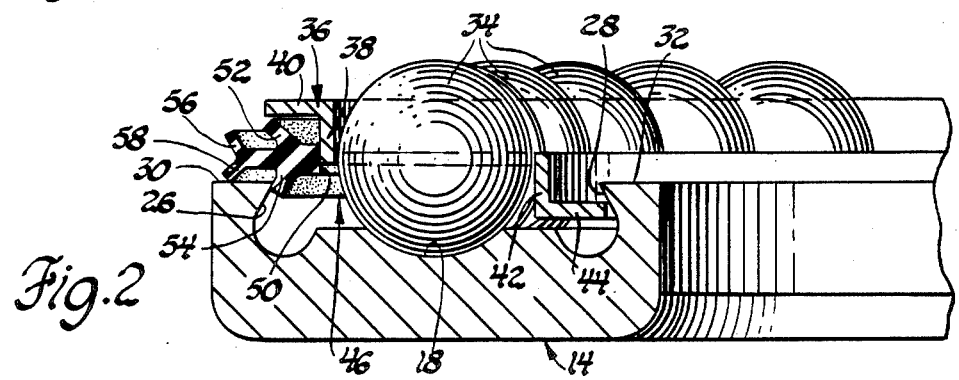
FIG. 2 is a sectional view showing the caged complement of rolling elements and outer seal assembled to the lower race prior to assembling the upper race and inner seal.

Referring next to FIGS. 2 and 3, given the relation of diameters described above and the elasticity of the seal material, the outer seal 46 may be supported by stretching its inner cylindrical surface 50 over the outer cage cylindrical wall 38. This maintains the free molded outer seal 46 in an annular configuration without the necessity of directly molding or bonding it to either of the races 12 or 14 or of adding a separate seal mounting groove thereto. Nor is it necessary to directly mold or bond the outer seal 46 to the cage 36. When outer seal 46 is so supported, the radially outer surfaces of its sealing walls 52 and 54 are held at a diameter that is slightly greater than the diameter of the race outer sealing surfaces 20 and 26, respectively. Therefore, when the caged complement of balls 34 is placed into the pathway 18 of lower race 14, the sealing wall 54 of the supported outer seal 46 snaps past the land 30 and axially overlaps the outer sealing surface 26, as best seen in FIG. 2. Likewise, when the upper race 12 is assembled over the complement of balls 34, the sealing wall 52 snaps past the land 24 and axially overlaps the outer sealing surface 20, as best seen in FIG. 3. The sealing walls 52 and 54 are each short enough to clear the cage flange 40. The relation of diameters of sealing walls 52, 54 and sealing surfaces 20, 26 just described assures that the sealing walls 52 and 54 are maintained by the supporting cage 36 in radially outwardly tensioned sealing engagement with the respective outer sealing surfaces 20 and 26. Unlike a conventional O-ring, the effectiveness of outer seal 46 is not dependent on the existence of a continual compressive load pushing the races 12 and 14 axially together. Regardless of whether bearing 10 is under load, cage 36 will maintain the radially outward tension of the sealing walls 52 and 54 against the respective outer sealing surfaces 20 and 26. That tension is aided by the fact that sealing walls 52 and 54 are at a more acute angle, as already described.

While bearing 10 will support a compressive load almost continually after installation, prior to installation, the races 12 and 14 will be subjected to the converse situation, such as an attempt to lift bearing 10 by grasping the upper race 12. Although not separately illustrated, it will be easily understood that, in such a situation, the cage flanges 40 and 44 will engage their respective sealing surfaces 20 and 26. That engagement will prevent the races 12 and 14 from axially separating by more than the predetermined axial clearance described. The axial overlap of the outer sealing surfaces 20, 26 and respective sealing walls 52, 54 is greater than the allowed axial separation of the races 12 and 14, so the seal will not be broken. Thus, the outer side of the bearing 10 is sealed at all times, regardless of whether the axial forces acting at the time are those tending to separate the races 12 and 14 or to push them together.

Referring to FIGS. 1 and 3, an additional advantage of the invention is that, when the races 12 and 14 axially separate within the limit allowed by the cage flanges 40 and 44, the sealing tension can actually increase, whereas it tends to disappear immediately with a conventional axially compressed O-ring. Considering the matching shape of the sealing walls 52, 54 and the respective outer sealing surfaces 20 and 26 and their orientation relative to the axis of bearing 10, it will be understood that the sealing walls 52 and 54 will be bent radially inwardly away from their FIG. 1 free state. The elastomer of the outer seal 46 is resilient, and it will tend to resist that bending, increasing the sealing tension. To provide additional sealing on the radially outer side of the bearing 10, the secondary sealing lips 56 and 58 of the outer seal 46 are axially compressed between the opposed lands 24 and 30, respectively, backing up the sealing walls 52 and 54. The edge to edge free state width of the secondary lips 56 and 58, seen in FIG. 1, is sufficiently greater than the axial separation of the opposed lands 24 and 30 so that, when the races 12 and 14 axially separate as far as allowed, the lips 56 and 58 are prevented from totally decompressing. Thus, the outer side of bearing 10 is doubly sealed at all times.

Referring again to FIGS. 1 and 3, inner seal 48 is molded of the same material and with a similar shape as outer seal 46. Although it is supported differently, inner seal 48 is sufficiently similar to outer seal 46 that it may be described more briefly. Outer seal 48 has an outer cylindrical surface 60, a pair of conical sealing walls 62 and 64, and a pair of secondary sealing lips 66 and 68 that have identical lengths, widths and angles as the corresponding structure of outer seal 46, although clearly located at smaller diameters. The radially inner surfaces of the sealing walls 62 and 64 have an inner diameter, in their FIG. 1 free state, that is approximately 5% smaller than the diameter of the respective inner sealing surfaces 22 and 28. Thus, inner seal 48 be supported by stretching its sealing walls 62 and 64 over the respective inner sealing surfaces 22 and 28 to remain in radially inwardly tensioned sealing engagement therewith, also independently of the axial forces acting on the bearing 10. That stretching may be conveniently done by a removable mandrel that holds inner seal 48 with wall 64 stretched over inner sealing surface 28 until upper race 12 can be added to push land 25 past sealing wall 62. Unlike outer seal 46, when inner seal 48 is in place, its outer cylindrical surface 60 has a radial clearance from the inner cylindrical cage wall 42, as cage wall 42 plays no part in supporting the inner seal 48. Just as with the outer seal 46, when the races 12 and 14 tend to axially separate, limited by the cage retention flanges 40 and 44, inner sealing surfaces 22 and 28 are prevented from disengaging with the respective sealing walls 62 and 64, allowing the sealing tension to increase. Just as with outer seal 46, the secondary sealing lips 66 and 68 provide additional inner side sealing between the lands 25 and 32, and are similarly prevented from decompressing. The net effect of all the mutual cooperation between the retention flanges 40 and 44, the sealing surfaces 20, 22, 26 and 28, and the free molded seals 46 and 48 is that the inner and outer sides of the bearing 10 are doubly sealed at all times, regardless of the axial forces acting thereon, and the bearing 10 is maintained as a unitary structure prior to installation. The bearing 10 is very simple, with no separate housings or other unitizing structure beyond the races and cage, and with free molded seals only. The bearing can be easily shipped and handled, and can be used in applications where it cannot be embedded in the elastomer of the McPherson strut mount.

The preferred embodiment disclosed may be altered within the scope of the invention. For example, a strictly cylindrical configuration of the sealing surfaces and the sealing walls could still provide sealing that was independent of the axial forces acting on the bearing 10. Thus, sealing surfaces 20, 22 and 26, 28 could be cylindrical, and the matching sealing walls 52, 62 and 54, 64 cylindrical as well. So long as the relation of diameters of sealing walls and sealing surfaces discussed above held, there would be a mutual radial tension maintained between the sealing surfaces and sealing walls, independent of the axial forces acting at the time on the bearing 10. The cage flanges 40 and 44 would have to interfit with some other structure of the bearing races 12 and 14 in order to prevent race separation, such as a cylindrical groove, as they could not radially overlie a strictly cylindrical sealing surface. Still, so long as the allowed axial separation of the races 12 and 14 was less than the axial overlap of sealing walls and sealing surfaces, the seal would be maintained at all times. However, it will be understood that the conical matching configuration of the sealing walls and sealing surfaces described is particularly advantageous, as it provides full time sealing that tightens upon race separation, and the conical sealing surfaces also cooperate with the cage flanges to prevent race separation. The secondary sealing lips could be eliminated, but, again, are particularly useful, as they provide backup of sealing, and also take advantage of the controlled axial separation of the races to maintain the additional sealing at all times.

The embodiments of the invention in which an exclusive property or privilege is claimed are defined as follows:

1. In a bearing having rolling bearing elements retained by a cage and received between pathways of a pair of axially opposed races, said bearing, after installation, operating under a compressive load that forces said races axially together, but subjected to axial forces tending to separate said races prior to installation, the improvement including free molded seals and race and cage structure that cooperate to seal said bearing at all times as well as to retain said races, cage and seals together as a unitary structure prior to installation, comprising, an inner and an outer generally conical sealing surface formed substantially identically into each race coaxial to and bordering each pathway, retention members formed on said cage and located so as to interfit with each of said races with a predetermined axial clearance, thereby reducing friction while said bearing operates, but preventing said races from axially separating by more than said predetermined axial clearance, a substantially cylindrical wall on said cage having a diameter less than said outer sealing surfaces, a generally annular elastomeric free molded outer seal having a free inner diameter less than said cage cylindrical wall, whereby said outer seal may be supported by stretching it over said cage cylindrical wall, thereby maintaining said outer seal in radially outwardly tensioned sealing engagement with said outer sealing surfaces independently of the axial forces acting on said bearing, said cage retention members, by preventing said races from axially separating by more than said predetermined clearance, thereby also preventing said outer seal and said outer sealing surfaces from axially disengaging, and, a generally annular elastomeric free molded inner seal having a smaller free inner diameter than said inner sealing surfaces whereby said inner seal may be supported by stretching it over said inner sealing surfaces so as to maintain it in radially inwardly tensioned sealing engagement therewith independently of the axial forces acting on said bearing, said cage retention members similarly preventing said inner seal and said inner sealing surfaces from axially disengaging, whereby both the inner and outer sides of said bearing are sealed and said bearing is maintained as a unitary structure prior to installation.

2. In a bearing having rolling bearing elements retained by a cage and received between pathways of a pair of axially opposed races, said bearing, after installation, operating under a compressive load that forces said races axially together, but subjected to axial forces tending to separate said races prior to installation, the improvement including free molded seals and race and cage structure that cooperate to seal said bearing at all times as well as to retain said races, cage and seals together as a unitary prior to installation, comprising, an inner and an outer conical sealing surface formed substantially identically onto each race coaxial to and bordering each pathway and diverging axially and radially relative to said pathways, retention flanges formed on said cage radially overlying at least one inner sealing surface on one race and one outer sealing surface on the other race with a predetermined axial clearance, thereby reducing friction while said bearing operates, but preventing said races from axially separating by more than said predetermined axial clearance, a substantially cylindrical wall on said cage having a diameter less than said outer sealing surfaces, a generally annular elastomeric free molded outer seal having a free inner diameter less than said cage cylindrical wall, said outer seal further including a pair of conical sealing walls shaped similarly to said outer sealing surfaces, whereby said outer seal may be supported by stretching it over said cage cylindrical wall, thereby maintaining said sealing walls in radially outwardly tensioned sealing engagement with said outer sealing surfaces independently of the axial forces acting on said bearing, said cage retention flanges, by preventing said races from axially separating by more than said predetermined clearance, thereby preventing said sealing walls and said outer sealing surfaces from disengaging while also allowing the tension of their sealing engagement to increase, by virtue of their matching conical shape and their orientation relative to the bearing axis, and, a generally annular elastomeric free molded inner seal having a pair of conical sealing walls shaped similarly to said inner sealing surfaces but with a smaller free inner diameter, whereby said inner seal may be supported by stretching its sealing walls over said inner sealing surfaces to remain in radially inwardly tensioned sealing engagement therewith independently of the axial forces acting on said bearing, said cage cage cylindrical wall, said outer seal further including a pair of conical sealing walls shaped similarly to said outer sealing surfaces, whereby said outer seal may be supported by stretching it over said cage cylindrical wall, thereby maintaining said sealing walls in radially outwardly tensioned sealing engagement with said outer sealing surfaces independently of the axial forces acting on said bearing, said outer seal also including a secondary sealing portion located radially outboard of said sealing walls and axially compressible between said races, said cage retention flanges, by preventing said races from axially separating by more than said predetermined clearance, thereby preventing said secondary sealing portion from totally decompressing and also preventing said sealing walls and said outer sealing surfaces from disengaging while also allowing the tension of their sealing engagement to increase, by virtue of their matching conical shape and their orientation relative to the bearing axis, and, a generally annular elastomeric free molded inner seal having a pair of conical sealing walls shaped similarly to said inner sealing surfaces but with a smaller free inner diameter, whereby said inner seal may be supported by stretching its sealing walls over said inner sealing surfaces to remain in radially inwardly tensioned sealing engagement therewith independently of the axial forces acting on said bearing, said inner seal also including a secondary sealing portion located radially inboard of said sealing walls and axially compressible between said races, said cage retention flanges similarly preventing said secondary sealing portion from totally decompressing and preventing said sealing walls and said inner sealing surfaces from retention flanges similarly preventing said sealing walls and said inner sealing surfaces from disengaging while allowing their tensioned engagement to increase, whereby both the inner and outer sides of said bearing are sealed and said bearing is maintained as a unitary structure prior to installation.

3. In a bearing having rolling bearing elements retained by a cage and received between pathways of a pair of axially opposed races, said bearing, after installation, operating under a compressive load that forces said races axially together, but subjected to axial forces tending to separate said races prior to installation, the improvement including free molded seals and race and cage structure that cooperate to seal said bearing at all times as well as to retain said races, cage and seals together as a unitary prior to installation, comprising, an inner and an outer conical sealing surface formed substantially identically onto each race coaxial to and bordering each pathway and diverging axially and radially relative to said pathways, retention flanges formed on said cage radially overlying at least one inner sealing surface on one race and one outer sealing surface on the other race with a predetermined axial clearance, thereby reducing friction while said bearing operates, but preventing said races from axially separating by more than said predetermined axial clearance, a substantially cylindrical wall on said cage having a diameter less than said outer sealing surfaces, a generally annular elastomeric free molded outer seal having a free inner diameter less than said disengaging while allowing their tensioned engagement to increase, whereby both the inner and outer sides of said bearing are doubly sealed and said bearing is maintained as a unitary structure prior to installation.

* * * * *